Jan. 8, 1963   H. S. VAN BUREN, JR   3,071,827
FASTENING DEVICE
Filed May 5, 1960
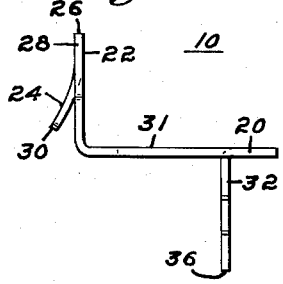
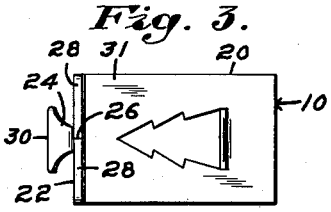
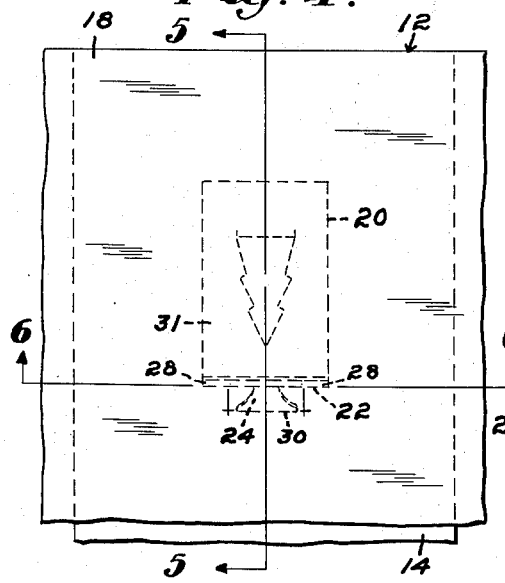
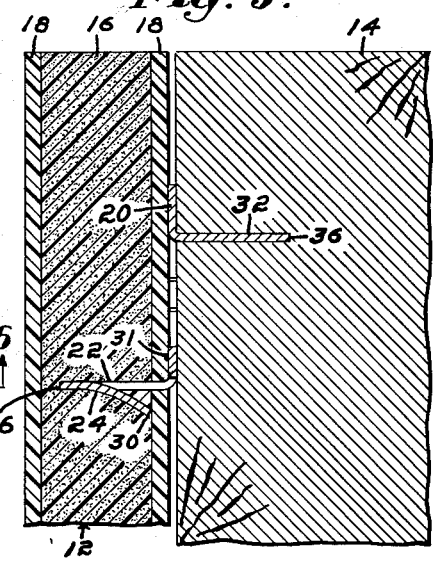
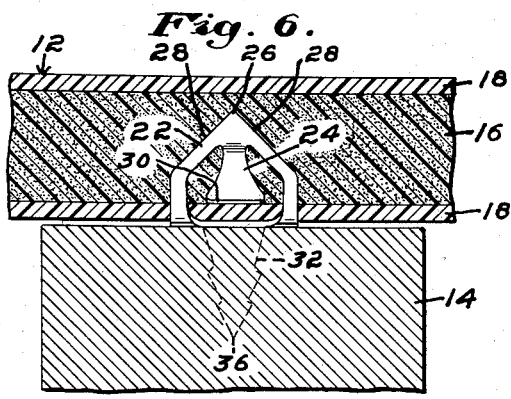
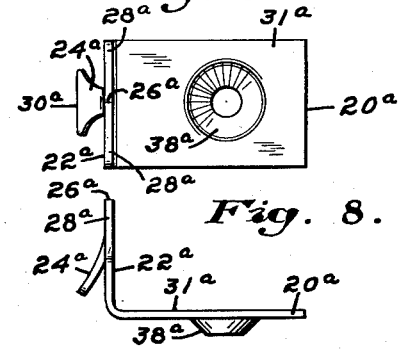
Inventor:
Harold S. van Buren Jr,
by James B. Tiffany Jr
Atty.

3,071,827
FASTENING DEVICE
Harold S. Van Buren, Jr., Cambridge, Mass., assignor to United-Carr Fastener Corporation, Cambridge, Mass., a corporation of Delaware
Filed May 5, 1960, Ser. No. 27,062
1 Claim. (Cl. 20—92)

This invention relates generally to fastening devices and in particular to a fastener for attaching panels or the like to structural supports.

Recent innovations in the building trade have resulted in the development of new materials for use in decorative paneling in homes and offices. Of particular importance is the ever increasing use of the newer plastics such as foam styrene sandwiched between outer layers of laminated plastic sheets. Foam styrene is a soft compressible product and conventional means of securing the panel to the building frame have been ineffectual.

The object of this invention therefore is to provide a panel fastener for use with these new materials to secure them firmly to a work support.

Another object of the invention is to provide a panel fastener constructed of a single piece of sheet metal which will penetrate the inner layer of laminated plastic and having integral stud means for securing the panel to a support.

A further object of the invention is to provide a fastening device for blind assembly into the panel whereby the panel may be secured to the support without visible means of anchorage.

Other objects of the invention will, in part, be obvious, and will, in part, appear hereinafter.

In the drawings:

FIG. 1 is a view in side elevation of the panel fastener;

FIG. 2 is a view in front elevation of the fastener of FIG. 1;

FIG. 3 is a top plan view of the fastener;

FIG. 4 is a view in front elevation of the panel having a fastener assembled therewith;

FIG. 5 is a view in section taken on the line 5—5 of FIG. 4;

FIG. 6 is a view in section taken on line 6—6 of FIG. 4;

FIG. 7 is a top plan view of a modified form of the fastener;

FIG. 8 is a view in side elevation of the fastener of FIG. 7.

Referring to the drawings, there is illustrated a fastener 10 adapted to secure a panel 12 to a support 14. The panel 12 consists of a compressible portion 16 of a granular foam styrene or other similar material sandwiched between and bonded to sheets of a comparatively rigid laminated outer and inner layers of plastic 18—18.

As illustrated in FIG. 1, the fastener 10 comprises, preferably, a single piece of spring sheet metal having a base 20 with one distal end providing a leg 22 extending upwardly at substantially right angles to the base. FIG. 2 shows the general configuration of the leg 22 where a tongue member 24 extends downwardly from the free end 26 and inclined out of the plane of the end. The tongue member 24 is disposed along the medial lateral line of the end 22 and spaced from the peripheral edges 28 to provide a relative degree of flexibility. The peripheral edges 28 begin to taper at a point spaced from the base 20 and join each other at a sharply pointed free end 26. The tongue member 24 has a wider free end 30 with respect to the general width of the tongue and terminates in spaced relation to the upper surface 31 of the base 20 for a purpose to be described hereinafter.

An attaching stud 32 is formed from the base 20 and extends downwardly out of the plane of the base 20 in a direction substantially opposite to the leg 22. As illustrated in FIG. 2, the stud is tapered with the edges notched 34 and terminates in a pointed free end 36. The panel 12 is secured to the support 14 by first driving the attaching stud 32 into the support, the notches 34 biting into the wood providing the retention factor. The panel 12 is then placed with the inner sheet 18 abutting the pointed end 26 of the distal end 22 and by striking the outer surface 18 of the panel, will cause the end 26 to penetrate the sheet 18. Continued pressure on the outer surface of the panel 18 permits the inclined tongue member 24, being made of spring sheet metal, to spring back substantially within the plane of the leg 22. After the distal end 30 passes within the sheet, it will flex outwardly from the plane of the leg 22 with the broad end cooperating with the inner surface of the inner sheet 18′ preventing removal of the leg 22. The entire panel having a plurality of fasteners thus assembled will be securely attached to the support.

FIGS. 7 and 8 illustrate a modified form of the invention where the base 20a has the distal end 22a and the tongue member 24a substantially as in the preferred form but a recessed aperture 38a is formed in the medial lateral portion of the base 20a whereby a flat headed nail (not shown) may be assembled with the fastener before insertion of end 22a into the panel. Mounting of the modified form of the invention is substantially the same as in the basic form whereby striking the panel 16 will cause the nail to penetrate the support 14.

Since certain other obvious modifications may be made in the device without departing from the scope of the invention, it is intended that all matters contained herein be interpreted in an illustrative and not in a limiting sense.

I claim:

A panel fastener construction comprising, in combination, a multi-layer panel having a compressible layer enclosed between comparatively rigid, pierceable first and second surface members, each of said surface members having an inner surface abutting said compressible layer, a support spaced from and in close proximity to said first surface member, and a fastener having a base, an angular extension, and an integral support engaging means, said angular extension having a sharply-pointed free end and a flexible locking tongue inclined out of the plane of said extension, said extension passing through said first surface member and into said compressible layer and said tongue displacing a portion of said compressible layer and engaging said inner surface of said first surface member to hold the panel and fastener in assembly and said integral support-engaging means extending from said base in a direction opposite to said panel-engaging extension in engagement with said support.

(References on following page)

References Cited in the file of this patent

UNITED STATES PATENTS

| | | | |
|---|---|---|---|
| 1,215,595 | Weikert | Feb. 13, | 1917 |
| 1,312,056 | Shaw | Aug. 5, | 1919 |
| 1,886,882 | Huber | Nov. 8, | 1932 |
| 2,077,604 | Wiley | Apr. 20, | 1937 |
| 2,084,544 | Wilson | June 22, | 1937 |
| 2,315,211 | Kost | Mar. 30, | 1943 |
| 2,319,058 | Hansman | May 11, | 1943 |
| 2,326,506 | Tummins | Aug. 10, | 1943 |
| 2,454,894 | Tatom | Nov. 30, | 1948 |
| 2,713,284 | Bedford | July 19, | 1955 |
| 2,751,052 | Flora | June 19, | 1956 |
| 2,879,570 | Becker | Mar. 31, | 1959 |
| 2,918,712 | Fernberg | Dec. 29, | 1959 |

FOREIGN PATENTS

| | | |
|---|---|---|
| 103,929 | Australia | 1938 |
| 830,143 | Great Britain | Mar. 9, 1960 |